United States Patent
Ravas et al.

[11] 3,740,640
[45] June 19, 1973

[54] RADAR POWER SUPPLY

[75] Inventors: Richard J. Ravas, Monroeville; Paul F. Pittman; Gary F. Saletta, both of Pittsburgh, all of Pa.

[73] Assignee: Westinghouse Electric Corporation, Pittsburgh, Pa.

[22] Filed: Oct. 8, 1970

[21] Appl. No.: 79,179

[52] U.S. Cl............... 323/17, 307/108, 307/246, 320/1, 323/22 T, 323/58, 323/DIG. 1
[51] Int. Cl..................... G05f 1/56, H03k 17/60
[58] Field of Search..................... 321/2, 45 C, 15, 321/21; 323/17, 22 T, 22 SC, 38, 58, 63, DIG. 1; 307/106, 108, 246, 252 J, 252 M, 246, 254; 328/65, 66, 67; 320/1

[56] References Cited
UNITED STATES PATENTS

| | | | |
|---|---|---|---|
| 3,628,047 | 12/1971 | Cronin et al...................... | 328/67 X |
| 3,363,184 | 1/1968 | Smith................................ | 328/65 |
| 3,562,623 | 2/1971 | Farnsworth...................... | 321/15 X |
| 3,553,620 | 1/1971 | Cielo et al......................... | 321/2 X |
| 3,564,393 | 2/1971 | Williamson....................... | 323/17 |
| 3,562,611 | 2/1971 | Gurwicz........................... | 321/45 C X |
| 3,571,697 | 3/1971 | Phillips............................. | 321/17 |

FOREIGN PATENTS OR APPLICATIONS

| | | | |
|---|---|---|---|
| 676,761 | 12/1963 | Canada............................ | 321/15 |

Primary Examiner—Gerald Goldberg
Attorney—F. H. Henson and E. P. Klipfel

[57] ABSTRACT

A radar power supply charges a pulse network in a sequence of high frequency charging pulses. Transformation, providing isolation and voltage boost between the primary power source and the pulse network, performed at high frequency, minimizes transformer size and weight. Means are provided for selectively adjusting the number of charging pulses and damping the last of the charging pulses, thereby eliminating requirements for filtering and precise regulation of primary power source while affording precise regulation of the voltage of the output energy pulse.

14 Claims, 18 Drawing Figures

RADAR POWER SUPPLY

BACKGROUND OF THE INVENTION

1. Field of the Invention

This invention relates to a radar power supply and, more particularly, to such a power supply employing a high frequency pulse charging network enabling substantial size and weight reductions in the power supply rendering it ideally suited for use in airborne and space vehicles.

2. Description of the Prior Art

Radar power supply systems of various types are well known in the art. The primary power sources for such systems typically include three-phase, 240 volt AC electrical power of 50, 60, or 400 Hz. The power requirement of a radar output device, however, is a high voltage, well-regulated pulse which is supplied to a suitable microwave generator.

In prior art systems, transformation of the relatively low level, AC voltage of the primary power supply to the high level DC voltage required for the output pulse of the radar power supply is achieved by fundamental frequency transformation and rectification with fundamental frequency filtering. The conventional prior art system employs a DC resonant charging circuit for charging an energy storage element to a high level DC voltage. The resulting pulse network voltage must be independent of input voltage variations or ripple from the primary power supply and also must be independent of the nature of the load pulse intervals, i.e., whether regular and periodic, or random. Typically, the system power supply is connected through a unidirectional conducting element, such as a diode, and a charging inductor to the pulse network. The pulse network in turn is connected to the primary of a coupling transformer, the secondary of which is connected to the load, for example, a microwave generator. A switch such as a thyratron is connected across the pulse network and the output coupling circuit.

With the switch in its off or non-conducting state, the system power supply charges the pulse network through the diode and charging inductor, the charging inductor cooperating with the pulse network to increase the charge across the latter in a conventional DC resonant charging operation. The thyratron switch is turned on upon completion of the charging, as described, for generating each output pulse. When the switch is in the on condition, an effective short circuit is established, connecting the pulse network to the coupling transformer and thereby transferring the energy stored in the pulse network to the load.

Prior art systems of the type described require ripple filtration circuits for removing the ripple frequency from the rectified AC power source voltage, and voltage regulation circuits for controlling the amplitude of the voltage developed at the pulse network, ultimately to be coupled to the load. The power supply filtering typically is achieved by large LC (inductive-capacitive) low-pass filters, and regulation is typically achieved by adjusting the Q of the resonant charging circuit.

In view of the relatively high power requirements of the utilization devices, e.g., microwave generators, conventional radar power supplies are of undesirably large size and weight, factors of substantial concern in use of such systems in airborne and space vehicles. Consideration therefore has been given to techniques for reducing the size and weight factors.

In conventional circuits, the only element that can be controlled to reduce size and weight is the charging inductor. However, certain limitations are imposed on the characteristics of the charging inductor required by such circuits. For example, if the size of the charging inductor is reduced for realizing a reduction in weight, the primary power source must produce a much higher peak current, albeit over a shorter period of time. Although the weight and size of the inductor may be reduced, a primary power supply having higher voltage and peak current capability is required with commensurate problems of increased weight and size. Conversely, by making the inductor larger, the peak current required to be drawn may be reduced but only with a commensurate increase in the charging time. The charging time, however, must be limited in accordance with the required pulse repetition frequency of the system.

These and other problems are overcome by the radar power supply of the invention through the technique of charging the network in a sequence of pulses. Whereas prior art systems require complex circuits to provide the necessary regulation and filtering, these functions are readily achieved in the system of the invention by controlling the number of charging pulses and, if better regulation is needed, adjusting the Q of the circuit during the last of such pulses to provide a well-regulated, ripple-free high power output pulse.

SUMMARY OF THE INVENTION

In accordance with the invention, high frequency charging techniques are employed, permitting a significant reduction in the weight and size of the radar power supply both through reduction of the transformer requirements in view of high frequency operation and by complete elimination of the massive charging inductor required in prior art circuit designs. The primary power supply provides a DC voltage derived by rectification of a multi-phase AC voltage of conventional voltage level and frequency. The AC voltage is passed through a full wave bridge rectifier, the output of which is supplied to a high frequency bypass filter, the latter, however, not being provided for ripple smoothing but merely to eliminate high frequency transients which may occur sporadically in the AC supply.

The thus filtered DC voltage is supplied to the primary of a special coupling transformer connected in series with a switching transistor. The secondary of the transformer is connected through a diode to the pulse network. The coupling transformer employs a gapped core structure, enabling it to function as an inductive energy storage element.

By appropriate selection of the relative polarity senses of the primary and secondary transformer windings, when the switching transistor is rendered conductive, the diode in the secondary circuit is reverse biased. The secondary winding therefore appears unloaded, looking at it from the primary winding. All energy which flows from the charging or primary power supply is stored in the air gap of the transformer. The transistor is then switched off, inducing a voltage in the secondary of opposite polarity, and thus poled for conduction of the diode. As a result, the stored inductive energy previously developed in the air gap of the special transformer is released, and current flows in the secondary circuit thus charging the pulse network. The pulse network is charged in this manner by a succession of pulses, each successive pulse necessarily being required to exceed the voltage level developed across the pulse network in prior pulsing steps. The number of pulsing steps may be preselected, or a suitable voltage sensor may be employed to define the number of pulses required, for developing the desired output voltage pulse.

In operation, the primary of the transformer is not a portion of a DC resonant charging circuit and, since primary and secondary currents never flow simultaneously, the voltage developed across the secondary of the coupling transformer can theoretically be infinite in value. In reality, the voltage developed across the secondary when the switching transistor is turned off is effectively determined by the voltage theretofore developed across the pulse network. In view of the effective isolation between the primary and the secondary windings, the transformer operates as an energy transfer device, first storing energy by virtue of primary current flow, when the transistor is conducting, and then discharging the stored energy of the primary winding circuit through the secondary winding circuit to the pulse network when the transistor blocks.

The basic technique of the high frequency sequential pulse charging effected in accordance with the above-described circuit may also be employed in a resonant commutated thyristor network in accordance with a second disclosed embodiment of the invention.

In accordance with either of the disclosed embodiments of the invention, the pulse network is charged with a large number of pulses at a relatively high pulse frequency permitting a substantial reduction in the inductive characteristics of the coupling transformer with commensurate weight and size reductions. Further, owing to the type of transformer connection used, the need for the conventional massive charging inductor is eliminated, resulting in further weight and size reductions.

Regulation and filtering of the output pulse is readily accomplished by controlling the number of the successive step pulses. A de-"Q" network, including a damper winding coupled to the primary winding of the coupling transformer, can be actuated if needed for closer regulation when the output voltage across the pulse network reaches the desired voltage level. The damper winding dissipates a portion of the energy stored in the transformer, and prevents it from flowing to the output pulse network.

Power supplies in accordance with the invention afford great versatility in use in that the capacitance of the pulse network or other load circuit may be increased to any required value without impairing the charging capability of the supply. In addition, plural such supplies can be employed in a parallel circuit configuration for energizing a charging network of lumped elements for increasing the total system power capacity and to provide redundancy.

These and other advantages and improvements of the radar power supplies of the invention will be more readily apparent from the following detailed description of the invention.

DETAILED DESCRIPTION OF THE INVENTION

Figure 1:
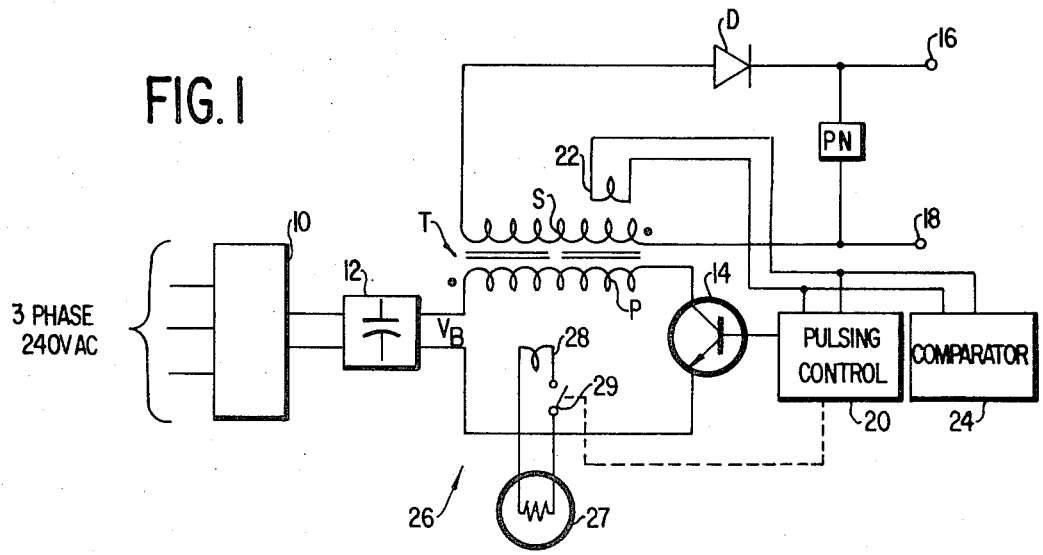
FIG. 1 is a schematic, partially in block diagram form, of a first embodiment of the radar power supply of the invention.

In FIG. 1 is shown a schematic, partially in block diagram form, of a radar power supply in accordance with the invention. Any suitable primary power supply may be employed providing a DC voltage $V_B$, for example 300 VDC. As shown, the voltage $V_B$ is obtained from a conventional power source of three-phase alternating current of 240 volts and of from 50 or 60 to 400 Hz. The three-phase power is provided through a full wave rectifier 10, the output of which is supplied to a high frequency bypass filter 12. As will hereinafter appear, the radar power supply of the invention does not require precise regulation of the input DC voltage and particularly can tolerate a certain amount of voltage variations or ripple in the DC voltage. Thus, the high frequency bypass filter 12 is provided only to filter out any high frequency transient voltages which may appear in the supply.

A special coupling transformer T has a gapped core structure, and includes a primary winding P connected in series with a power switching transistor 14 to the primary power source. The secondary S of the transformer T, poled as indicated, is connected in series with a diode D across the terminals of a pulse or storage network PN. Terminals 16 and 18 represent connections to a utilization device, not shown in FIG. 1 but typically comprising a microwave generator.

Connected to the base of the switching transistor 14 is a pulsing control circuit 20. For a reason to be explained, the pulsing control circuit 20 includes a first input associated with a sense winding 22 and a second input derived from a comparator 24, the latter also being connected to the sense winding 22.

As also later explained, the system may further include a de-Q network 26 comprising a dissipative element 27, a winding 28 coupled to the primary winding P of transformer T, and a switch 29. The switch 29 is actuated at a specified time by the pulse control circuit 20.

Figure 2:
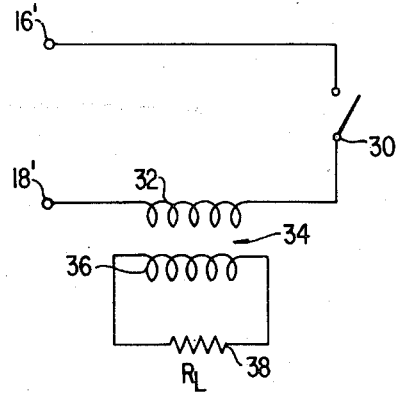
FIG. 2 is a schematic diagram of a utilization circuit, such as a microwave generator, to be driven by the radar power supply of the invention.

FIG. 2 comprises a schematic illustrating a suitable utilization device for FIG. 1. Connected to the terminals 16' and 18', respectively corresponding to the terminals 16 and 18 in FIG. 1, is a switch 30 and a primary 32 of a coupling transformer 34, the secondary winding 36 of which has connected across its terminals the ultimate utilization device 38 illustrated as a load $R_L$ and comprising, for example, a microwave generator.

In operation of the circuit of FIG. 1, the pulsing control 20 serves to switch the power switching transistor 14 on and off a number of times for charging of the pulse network PN to the desired voltage level. The circuit response for each cycle of switching on and off of the transistor 14 will first be considered.

When transistor 14 is initially switched to a conducting state, current flows from the primary power source through the series-connected primary winding P and the transistor 14, the primary winding P absorbing energy from the power supply. In view of the polarity sense of the windings P and S of transformer T, however, the voltage developed in the primary winding P and coupled to the secondary winding S does not cause a flow of current in the latter since the diode D is reverse biased. Thus, the secondary winding S appears to be unloaded, when looked at from the primary winding P, and the energy is stored by transformer T.

Figure 1A:
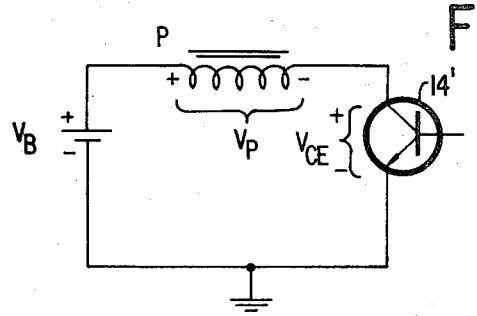
FIGS. 1a and 1b are schematic diagrams representing the equivalent circuits of the system of FIG. 1 during two different, respectively associated, phases of the charging operation.

FIG. 1a is a schematic of the effective charging circuit of the primary winding P. As previously noted, the secondary is isolated during the conducting interval of transistor 14' and thus the equation relating voltage drops in the primary winding circuit is:

$$V_B = V_P + V_{CE} = L_P dI_P/dt + V_{CE} \tag{1}$$

Where $V_B$ is the primary source voltage, $V_P$ is the voltage developed across the primary winding, $V_{CE}$ is the voltage across the collector to emitter terminals of the switching transistor, $L_P$ = effective inductance of transformer primary, and $I_P$ is the current in the primary winding. The energy which flows from the charging source $V_B$ is stored in the air gap of the transformer and has a magnitude:

$$W = \tfrac{1}{2} L_P I^2_P \tag{2}$$

where $I_P$ is the peak transformer primary current.

When transistor 14 is turned off, the primary circuit becomes open-circuited and the current flow terminates. The voltage of the primary winding P reverses in polarity by Lenz's Law in an attempt to maintain the previous current flow. The voltage induced in the secondary winding S likewise reverses in polarity and accordingly forward biases the diode D, whereby current flows in the secondary circuit to charge the pulse network PN. Thus, the energy stored in the transformer T is transferred to the secondary winding S and thus to the high voltage pulse network PN.

Figure 1B:
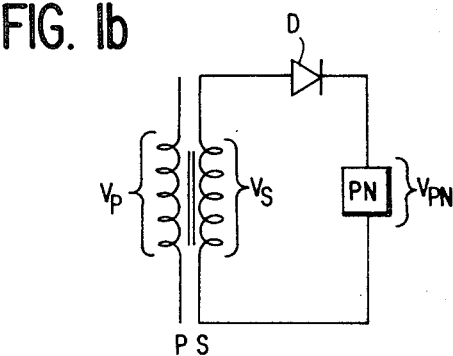

In FIG. 1b is shown the effective secondary charging circuit during the off interval of the transistor 14, and during which interval current has ceased to flow in the primary winding P. As is apparent in FIG. 1b, the value of $V_P$ is determined by $V_{PN}$ as reflected back by the secondary winding S to the primary winding P. During the interval when transistor 14 is off, $V_P$ is independent of $V_B$. Each time transistor 14 is turned off, a voltage $V_S$ is induced in the secondary winding exceeding the voltage developed across the pulse network PN by energy stored therein to effect continued charging of the latter by succeeding charging pulses. The magnitude of this voltage is not related to $V_B$ or to the transformer turns ratio, but is simply that value which, by overcoming the pulse network charge voltage, causes diode D to become conductive and allow secondary current to flow.

Figure 4:
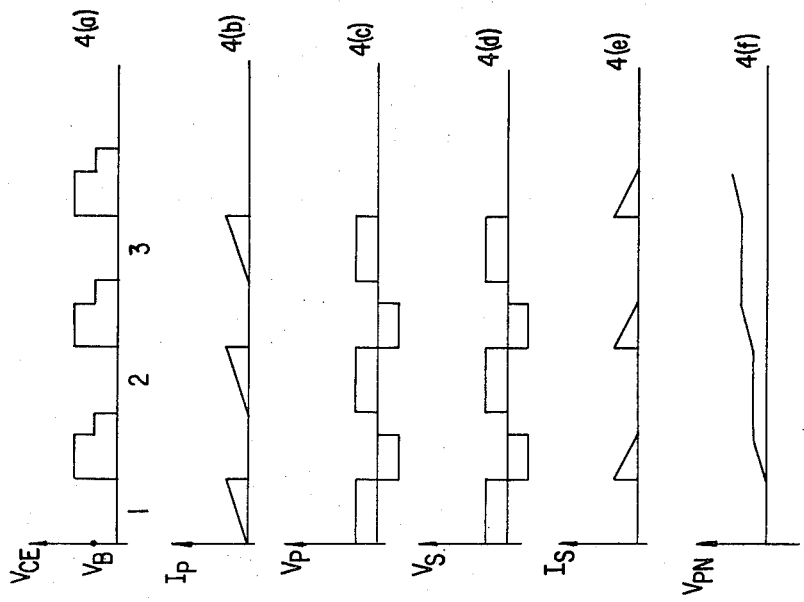
FIGS. 4a through 4f comprise, variously, current and voltage waveforms representing the operation of the circuit of FIG. 1.

With reference to the waveforms of FIGS. 4a through 4f, the successive switching on and off of transistor 14 is represented in FIG. 4a, illustrating the collector to emitter voltage of transistor 14. Where $V_B$ represents the primary source voltage, in the off state of the transistor the voltage $V_{CE}$ is equal to the sum of $V_B$ and a $V_P$ component which is $V_{PN}$ reflected back by the turns ratio and in the on state is essentially zero volts. As previously noted, the transistor 14 is switched on and off a number of times sufficient to develop the desired voltage across the pulse network PN in FIG. 1, the switching being represented in FIG. 4a by a series of conducting intervals 1,2,...

The current flow $I_P$ in the primary winding P resulting from the conducting intervals of transistor 14 is represented in FIG. 4b. The inductance of the primary winding P is relatively high and, as a result, a generally linear increase in current during the conducting interval results, in accordance with:

$$(dI_P)/d_t = V_B/L_P \tag{3}$$

where $I_P$ is the current in the primary winding;
$L_P$ is the effective inductance of the primary winding P;
$V_B$ is the primary DC source voltage as above identified;
and the voltage drop across the transistor ($V_{CE}$) during conduction is assumed to be negligible compared with $V_B$. The voltage $V_P$ of the primary winding P in the successive cycles is illustrated in FIG. 4c. Note that during the off interval, the primary voltage goes to zero when secondary current ceases.

Since the secondary winding S is floating when the primary winding P is energized or excited, and similarly the primary is floating when the secondary is excited, there is no fixed ratio between the input voltage of the primary winding P when the transistor is conducting and output voltage of the secondary winding S when the transistor is off. By providing a secondary-to-primary voltage transformer ratio of 100:1, for $V_B$ = 300 VDC, the output voltage will be in the range of 30 K VDC, depending upon the number of charging steps employed. If no de-Qing is used, the final pulse network energy can be regulated to ±1 pulse. For example, if the system is designed so that nominally twenty pulses are necessary to charge the pulse network to full voltage, the network energy will be within ±5 percent.

The waveform of the voltage $V_S$ induced in the secondary winding S and the resultant current pulses $I_S$ which flow in the secondary circuit for charging the pulse network PN are shown in FIGS. 4d and 4e, respectively. The secondary current $I_S$ increases rapidly upon termination of the current flow in the primary winding $I_P$ of FIG. 4b and decreases as energy is transferred from the secondary winding S to the pulse network PN. Accordingly, the transformer T effects, during each pulsing cycle, an energy transfer wherein the energy stored in the air gap $\tfrac{1}{2}LI^2$ is transferred, less losses, to the secondary, and ultimately to the pulse network PN as the energy $\tfrac{1}{2}CV^2$ for energization of the load. The resultant, successive step charging of the pulse network PN is illustrated in the waveform of FIG. 4f.

As is apparent from the foregoing discussion of operation, the mutually exclusive floating conditions require that the current flow in the primary winding P must not be initiated until current flow in the secondary winding S has decreased to zero. Accordingly, the pulsing control circuit 20 responds to the output of sense winding 22 to assure that transistor 14 is switched on only after that condition has obtained.

As previously noted, the system may be designed to allow a predetermined number, $n$, of pulsing intervals for developing the requisite energy storage in the pulse network PN. Pulsing control circuit 20 may correspondingly include a counter preset to the desired number of pulsing intervals $n$ to achieve the desired energy levels. When the preset count is attained, the control circuit 20 may also actuate the utilization circuit for receiving the output pulse from the pulse network PN, and then reset the counter to initiate a subsequent pulse charging cycle. Unfortunately, this technique produces an output voltage which is sensitive to regulation and ripple in $V_B$ as well as load variations.

Alternatively, or in cooperation therewith, a comparator circuit 24 may be provided for responding to the output of sense winding 22 to produce a control input to pulsing control circuit 20 for terminating the succession of pulsing intervals when the desired output voltage level is attained. It is apparent that the IR drop in the secondary winding S will affect the output voltage sensed by the sense winding 22, and suitable correction for this should be provided; alternatively, the comparator may receive its sensed output voltage level directly from the pulse network PN to avoid this inaccuracy.

As hereinabove noted, a significant feature of the power supply of the invention is that the feedback system is not deleteriously affected by variations, or ripple, in the voltage from the primary power source and does not require filtering of the voltage applied to the pulse network PN charging circuit. Precise regulation of the final voltage obtained across the pulse network PN and elimination of the ripple, or voltage variations, which may be present is effected by selectively controlling the energy of the charging pulse during the last pulse interval.

More particularly, the de-Q network 26 is switched into the circuit during the last pulse interval by the pulsing control circuit 20 which, illustratively, acts to close the switch 29 and complete the circuit between the dissipative element 27 and the winding 28. The damper winding 28 and the element 27 thus are coupled into the primary circuit when the output voltage reaches the desired level, dissipating the remaining energy stored in the transformer T rather than permitting it to flow as a current from the secondary winding S to the pulse network PN. This same function can be performed in a non-dissipative manner if desired; however, since each charging pulse presents only a small fraction of the desired output energy, for example, 5 percent in a 20 pulse design, even a completely dissipative network will cause only a commensurate, and thus relatively insignificant, system energy loss.

Numerous advantages of the radar power supply of the invention are apparent from the foregoing, and some are here reconsidered. The size of the transformer T and, generally, the magnetics associated with the circuit are operated at high frequency, whereby the size and rating of the transformer may be reduced, providing both size and weight savings. The pulsing technique affords accurate and simplified control of the voltage level developed across the PN network and, by the de-Qing function performed during the last pulsing interval, provides precise regulation and ripple smoothing of the final output DC voltage level. Finally, the application of the de-Qing network during the last cycle provides a significant improvement in efficiency over the prior art which employs de-Qing during a major portion of the charge cycle.

Figure 3:
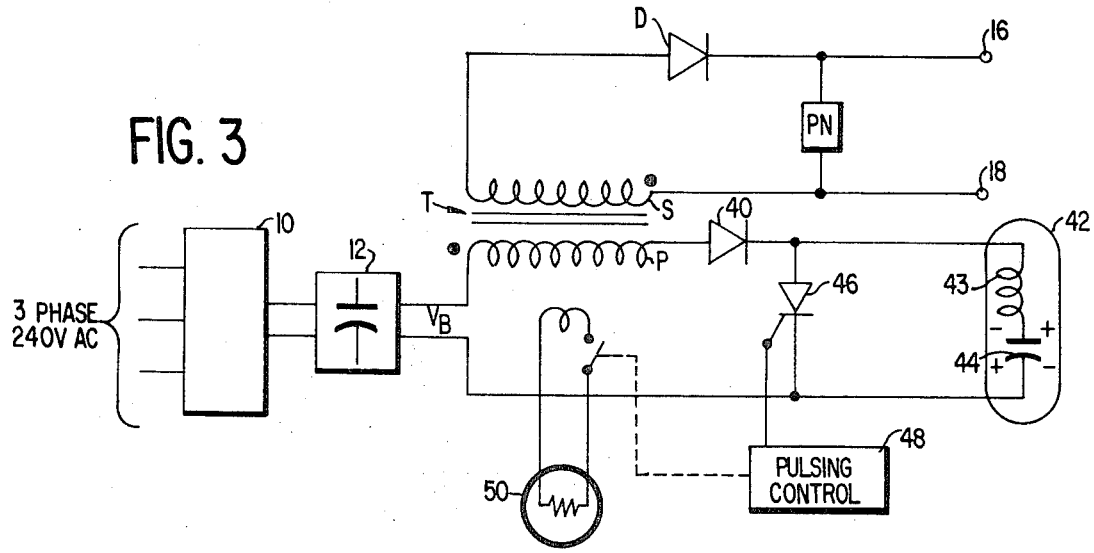
FIG. 3 is a schematic diagram, partially in block diagram form, of a second embodiment of the radar power supply of the invention employing a resonant commutated thyristor network.

In FIG. 3 is shown a schematic, partially in block diagram form, of a second embodiment of a radar power supply in accordance with the invention. The system of FIG. 3 employs a resonant commutated thyristor network in the primary circuit for providing successive pulsing in developing the requisite charging of the pulse network. The system of FIG. 3 is in many respects identical to that of FIG. 1, and includes a full wave rectifier 10 and a low pass filter 12 for supplying the primary power supply voltage $V_B$. The transformer T again includes primary windings P and S as in FIG. 1, the secondary circuit S including a diode D and a pulse network PN in which the output pulse is developed for ultimate supply to a utilization circuit connected to terminals 16 and 18.

In FIG. 3, however, the primary circuit P includes a diode 40 connected in series with a resonant commutating circuit 42 including an inductor 43 and a capacitor 44. A gate controlled switching device such as a thyristor 46 is connected in shunt with the commutating circuit 42. A pulsing control circuit 48 supplies a trigger pulse to the gate of thyristor 46 and, as in FIG. 1, also actuates a switch of a de-Q network 50 associated with the primary winding P, the latter serving the identical function as the de-Q network 26 of FIG. 1.

Figure 5:
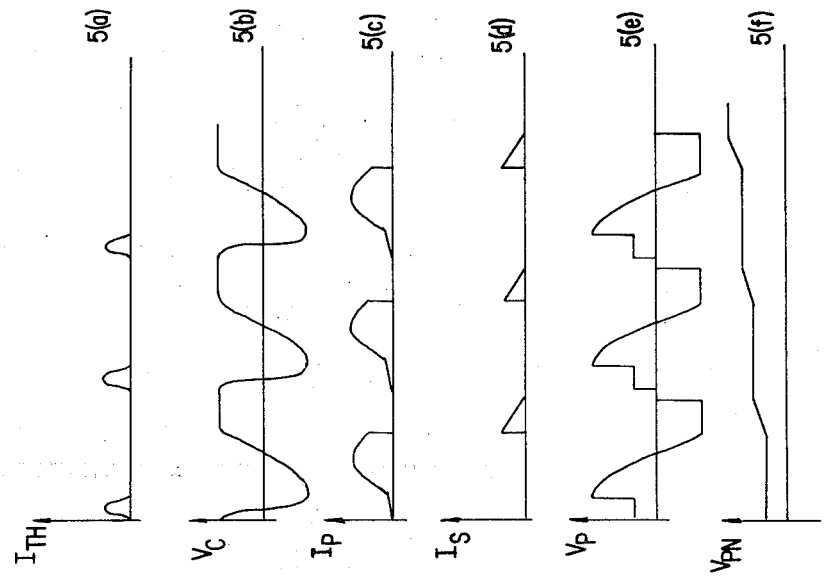
FIGS. 5a through 5f comprise, variously, current and voltage waveforms representing the operation of the circuit of FIG. 3.

The operation of the circuit may be explained with the aid of the waveforms of FIGS. 5a through 5f, which show voltage and current waveforms occurring as the network is charging. When the SCR 46 is gated on by the pulsing control circuit 48, an effective short circuit shunt path is produced across the commutating circuit 42 as represented by the current pulse of $I_{Th}$ in FIG. 5a. The resultant fly wheel action of the inductor 43 causes the voltage across the capacitor 44 to reverse in polarity as illustrated in the waveform of FIG. 5b, commutating thyristor 46 to an off condition.

Current now flows through the primary winding P of the transformer T, as shown in FIG. 5c, to re-establish the voltage across the capacitor C in the positive direction. The charging path includes the inductors comprising the primary winding P and inductor 43 of the commutating circuit 42. During this time, no secondary current flows as shown in FIG. 5d. As shown in FIG. 5e, the transformer primary voltage, and the secondary voltage as well, decrease toward zero and then reverse polarity as primary current continues to flow into the capacitor 44. When the secondary voltage reaches the value of the voltage already in the pulse network PN, diode D conducts causing current flow to be directed from the primary to the secondary as shown in FIGS. 5c and 5d. The flow of secondary current further charges the pulse network PN, raising its voltage level as shown in FIG. 5f. As diode D conducts secondary current, and during the interval after secondary current stops but before the thyristor is triggered, diode 40 prevents capacitor 44 from discharging back through transformer T. As was the case with the transistor circuit shown in FIG. 1, transformer T acts as a pump to first store energy from a source and then discharge it into a sink, or storage system, and particularly the PN network.

The system of FIG. 3 may be preferable for certain applications to that of FIG. 1. The transistor switch 14 of FIG. 1 must be capable of handling high power at high speed switching rates; the stringent requirements imposed on such an element are eliminated in the circuit of FIG. 3. In FIG. 3, termination of current flow in the primary circuit is effected by the diode D, the function of thyristor 46 being to trigger into operation the resonant commutating function of the circuit 42. Primary current $I_P$ flows when thyristor 46 is in its off state, and the resonant, or flywheel action of the commutating circuit 42 itself provides for reverse biasing of the thyristor 46 to switch it back to its off state.

The circuit of FIG. 3 further includes sensing and control circuits for the pulsing and de-Qing functions as described in relation to FIG. 1, and therefore are not here shown or described.

Figure 6:
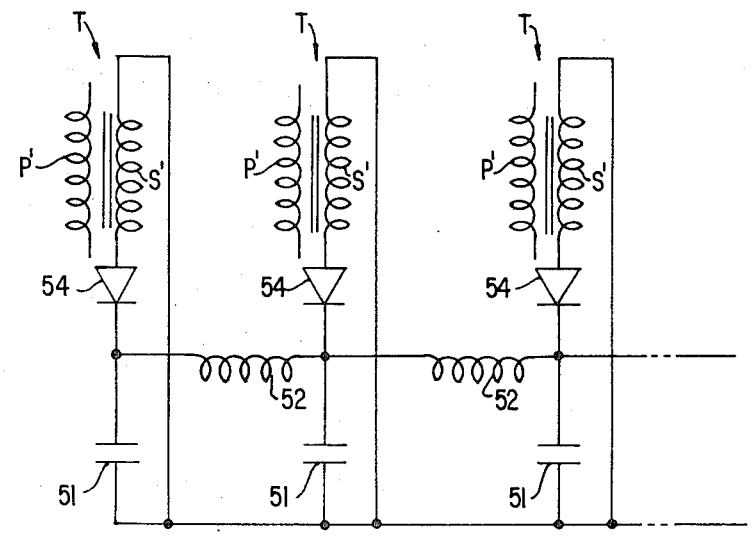
FIG. 6 is a schematic of a lumped pulse network employing plural power supplies in accordance with the invention.

In FIG. 6 is shown a schematic of a pulse network having coupled thereto a plurality of power supplies in accordance with the invention. The pulse network includes lumped capacitive elements 50 and inductors 52. Charging of each of capacitive elements 50 is effected by current pulses induced in a secondary winding S' connected through corresponding diodes 54 to the respectively associated capacitors 50. The windings S' correspond to the secondary winding S of the system of either FIG. 1 or FIG. 3. Similarly, the primary windings P' in the circuit of FIG. 6 represent the primary circuit including the primary winding P of either of the system of FIG. 1 or FIG. 3. Preferably, the characteristics of each corresponding power supply and charging network are matched to assure uniformity of the output pulses.

It is apparent that various modifications may be made in the system described herein without departure from the scope of the invention. Accordingly, the invention is not to be considered limited by the description, but only by the scope of the appended claims.

We claim as our invention:

1. A power supply comprising:
   a transformer having primary and secondary windings,
   a primary circuit including said primary winding and switching means, said primary circuit being connectable to a primary power source for energizing said primary winding,
   a secondary circuit electrically floating relative to said primary circuit including said secondary winding, storage means and uni-directional conducting means connecting said secondary winding to said storage means for charging said storage means upon excitation of said secondary winding in a sense whereby said uni-directional conducting means is poled for conduction,
   pulsing control means for successively actuating said switching means to energize said primary circuit from said primary power source in a succession of current pulses, said transformer effecting an energy transformation of said pulses to said secondary circuit only during intervals between said succession of said current pulses for varying in successive increments the level of energy stored on said storage means until a desired direct current output voltage is achieved after some given number of said current pulses,
   a de-Q network coupled to said primary winding responsive to said pulsing control such that said de-Q network is operative only during the last pulse interval to achieve regulation of output voltage developed in said storage means.

2. A power supply as recited in claim 1 wherein said de-Q network includes:
   a winding coupled to said primary winding,
   a dissipative element, and
   a switch connecting said winding and said dissipative element, said switch being normally open and being actuated to a closed position for connecting said dissipative element to said winding by said pulsing control means during said last pulse interval.

3. In a power supply including a transformer having primary and secondary windings, wherein the secondary winding is connected in a secondary circuit including a series connected uni-directional conducting means to a storage means, the method of operating comprising:
   energizing said primary winding with a succession of current pulses defining a corresponding succession of charging pulse intervals, said current pulses in said primary winding being of predetermined polarity with regard to the relative polarity sense of said secondary winding for reverse biasing said uni-directional conducting device of said secondary circuit during each current pulse in said primary winding, to cause the secondary winding to appear unloaded from said primary winding,
   successively rendering said primary winding effectively open-circuited following each energizing current pulse and during each energy transformation by said transformer to said secondary winding, said secondary winding being energized thereby in a polarity sense for conduction of said uni-directional conducting device for varying in successive increments the charge level on said storage means in accordance with said succession of pulse intervals, and
   discontinuing pulsed energization of said primary winding when said storage means is charged to the desired level.

4. In a power supply including a transformer having primary and secondary windings, wherein the secondary winding is connected in a secondary circuit including a series-connected uni-directional conducting means to a storage means, the method of operation comprising:
   energizing said primary winding with a succession of current pulses defining a corresponding succession of charging pulse intervals, said current pulses in said primary winding being of predetermined polarity with regard to the relative polarity sense of said secondary winding for reverse biasing said uni-directional conducting device of said secondary circuit during each current pulse in said primary winding, to cause said secondary winding to appear unloaded from said primary winding,
   successively rendering said primary winding effectively open-circuited following each energizing current pulse and during energy transformation by said transformer to said secondary winding, said secondary winding being energized thereby in a polarity sense for conduction of said uni-directional conducting device for varying the charge level in successive increments on said storage means in accordance with said succession of pulse intervals, discontinuing the pulse energization of said primary winding when said storage means is charged to the desired level, and damping said primary winding during the last of the successive pulse intervals for regulating the voltage developed across said storage means.

5. Power supply circuitry for repeatedly varying the energy level of a storage means to thereby provide an output signal thereacross of a desired magnitude, said circuitry comprising:

transformer means having primary and secondary windings, each of said windings being electrically floating with respect to the other, uni-directional conducting means coupled between said secondary winding and said storage means, and control means for successively applying a series of pulse-like signals to said primary winding, said uni-directional conducting means being so connected to said secondary winding and said secondary winding being poled in an opposite sense from that of said primary winding so that upon energization of said primary winding, said uni-directional conducting means is reverse-biased and that upon termination of energization of said primary winding, said transformer effects energy transformation to said storage means, said control means controlling the successive transfers of energy to said storage means until a desired magnitude of energy has been stored on said storage means.

6. Power supply circuitry as claimed in claim 5, wherein said control means is responsive to the termination of the current flow in said secondary winding for initiating the application of a pulse-like signal to said primary winding.

7. Power supply circuitry as claimed in claim 5, wherein said control means is responsive to the application of a predetermined number of pulse-like signals to said primary winding for terminating the further application of the pulse-like signals to said primary winding.

8. A power supply comprising:

a transformer having primary and secondary windings, a primary circuit including said primary winding and switching means, said primary circuit being connectable to a primary power source for energizing said primary winding, a secondary circuit electrically floating relative to said primary circuit including said secondary winding, a pulse network, and uni-directional conducting means connecting said secondary winding to said pulse network for charging said pulse network upon excitation of said secondary winding in a sense whereby said uni-directional conducting means is poled for conduction, and pulsing control means for successively actuating said switching means to energize said primary circuit from said primary power source in a succession of current pulses, said transformer effecting energy transformation of said pulses to said secondary circuit only during intervals between said succession of said current pulses for varying in successive increments the level of energy stored on said storage means until a desired direct current output voltage level is achieved and wherein said pulsing control means is responsive to the energy level developed in said secondary circuit for discontinuing said actuation of said switching means when the desired output voltage is developed in said pulse network.

9. A power supply as recited in claim 8 wherein there is further provided:

a sense winding coupled to said secondary winding for sensing the voltage level developed in said secondary circuit for energization of said pulse network, a comparator connected to said sense winding for comparing the sensed voltage with the desired output voltage of said pulse network, said comparator supplying a signal to said pulsing control means when the sensed voltage corresponds to the desired output voltage of said pulse network, and said pulsing control means discontinues switching of said switching means in response to receipt of said comparator signal.

10. A power supply as recited in claim 8 wherein there is further provided:

means for sensing the flow of current in said secondary winding, and said pulsing control means is responsive to said sensing means to effect energization of said primary circuit by actuation of said switching means to permit the flow of energizing current in said primary winding only upon termination of current flow in said secondary winding.

11. A power supply as recited in claim 8 wherein said switching means comprises a switching transistor having its collector-emitter conducting path connected in series with said primary winding in said primary circuit.

12. A power supply as recited in claim 8 wherein said switching means comprises a resonant commutated thyristor network.

13. A power supply as recited in claim 12 wherein: said resonant commutated thyristor network comprises a unidirectional conducting device and a resonant commutating circuit connected in series with said primary winding in said primary circuit, and a thyristor connected in shunt with said resonant commutating circuit, said resonant commutating circuit being charged by current flow from said primary power source through said primary winding, and said pulsing control means selectively actuates said thyristor to establish a shunt conducting path across said resonant commutating circuit, conduction of said resonant commutating circuit through said shunt path thus established developing a bias potential for reverse biasing said unidirectional conducting device and terminating current flow in said primary circuit to complete a given pulse interval, and for commutating said thyristor to permit current flow in said primary circuit to initiate a subsequent pulse interval.

14. A power supply as claimed in claim 8, wherein said transformer includes a gapped core.

* * * * *